Patented Dec. 27, 1949

2,492,693

UNITED STATES PATENT OFFICE 2,492,693

PROCESS FOR THE CATALYTIC INTERCONDENSATION OF MONOOLEFINS

William V. Freed, Wilmington, Del., assignor to E. I. du Pont de Nemours & Company, Wilmington, Del., a corporation of Delaware No Drawing. Application December 30, 1946, Serial No. 719,340

12 Claims. (Cl. 260—683.15)

1

This invention relates to a catalytic process and more particularly to a process for the catalytic synthesis of liquid low molecular weight monoolefins. More specifically, this invention relates to a process for the catalytic synthesis of liquid monoolefins by the intermolecular condensation of two or more different open-chain gaseous monoolefins.

Processes for the alkylation of olefins using acidic catalysts are well known in the art. The use of reduced metals as catalysts for effecting the polymerization of hydrocarbons is also known but these methods lead to the formation of complex hydrocarbon mixtures. On the other hand, use of alkali or alkaline earth metals as catalysts has been confined to processes for converting gaseous hydrocarbons to complex polymeric products in the lubricating oil range by polymerization reactions. These prior art methods result primarily in the formation of complex products which contain essentially no low molecular weight monoolefins.

It is an object of this invention to provide a practical process for condensing two or more different normally gaseous monoolefins to low molecular weight liquid monoolefins. A further object is to provide a process for condensing two or more normally gaseous monoolefins at relatively low temperatures, thus minimizing complicated side reactions and producing high conversions to low molecular weight liquid monoolefins. A still further object is to provide an economical process for the production of low molecular weight liquid monoolefins, especially those of an uneven number of carbon atoms which heretofore have been difficult to make by direct synthesis. Other objects will appear hereinafter.

These objects are accomplished by the following invention which comprises heating two or more different normally gaseous open-chain monoolefin hydrocarbons at a temperature in the range of 100° to 300° C. under pressure above 100 atmospheres in the presence of an alkali metal catalyst and a polynuclear aromatic hydrocarbon promoter to form low molecular weight normally liquid monoolefin hydrocarbons. It has been discovered that by the process of this invention two or more different normally gaseous monoolefins can be intermolecularly condensed to give high yields of low molecular weight normally liquid monoolefins with the substantial absence of high molecular weight polymerization products. For example, propylene and ethylene are condensed over an alkali metal in the process of this invention to give high yields of $C_5$ and $C_7$ olefins with no evidence of $C_4$ or $C_6$ olefins which would be formed if polymerization of the individual gaseous hydrocarbons occurred.

In the process of this invention it is necessary to use pressures above 100 atmospheres. Usually, however, pressures in the range of 200 to 1000 atmospheres are necessary, since under these conditions a satisfactory reaction rate is obtained. The upper pressure limit will depend upon the limitations of the reaction vessel, although for the most part pressures up to 1500 atmospheres represent a practical upper limit.

Catalysts for the process of this invention consist of any of the alkali metals of the first group of the periodic table, alone or in combination. These catalysts are used in amounts ranging from 3 to 15 parts by weight, based on the quantity of the higher molecular weight olefin used as starting material. In general, metallic sodium and potassium are preferred in the process of this invention owing to their low melting points, superior activity, economy, and lack of tendency to induce or promote undesirable side reactions.

As promoters for the process of this invention any polynuclear aromatic hydrocarbon can be employed. From the standpoint of superior activity, selectivity and economy the condensed ring polynuclear aromatic hydrocarbons are preferred and of these naphthalene and anthracene are particularly satisfactory. Other suitable promoters consist of the following which can be employed alone or in combination: triphenylmethane, indene, fluorene and acenaphthene. These promoters are used in amounts ranging from 3 to 20 parts by weight, based on the quantity of higher molecular weight olefin used as starting material.

In a preferred embodiment of this invention, intercondensation liquid products of at least two different normally gaseous monoolefins are produced according to the following general procedure: Eight parts by weight of metallic sodium and ten parts by weight of anthracene are charged into a stainless steel lined pressure tube provided with a device for efficient agitation and adapted to operation at elevated temperatures and pressures. The pressure tube is evacuated and 84 parts of propylene charged. The tube is charged with ethylene under 50 atms. pressure while heating to the desired reaction temperature of 125° to 175° C. The ethylene pressure is then increased until the total pressure is in the range of 200 to 1000 atms. Under these conditions ethylene is absorbed over a period of 6 to 10 hours, and additional amounts of ethylene are introduced intermittently to maintain the total pressure in the desired operating range of 200 to 1000 atms. When ethylene absorption has ceased, the reaction tube is cooled, the contents removed and the product separated by precision fractional distillation.

In the process of this invention it is desirable to continue agitation and heating of the reaction vessel only during the period of gas absorption and to discontinue heating when the rate of gas absorption has definitely decreased. This avoids secondary reactions between liquid products and gaseous olefins which lead to low yields of desired products and large amounts of polymeric hydrocarbons.

The following examples illustrate the process of this invention and demonstrate the preferred conditions for the catalytic intercondensations of gaseous olefins. Unless otherwise stated, quantities are expressed as parts by weight.

Example I

Eight parts of metallic sodium and 10 parts of naphthalene were charged into a high pressure reaction tube provided with a device to agitate the contents vigorously. The tube was evacuated and 84 parts of propylene added. Ethylene was injected to a pressure of about 50 atm. and the tube heated to 250° C. The total ethylene pressure was then raised to 500 atm. During a period of 8 hours there was a total ethylene pressure drop of 350 atm. Ethylene pressure was maintained during the course of the run at between 400 and 500 atm. by frequent repressuring. When smooth ethylene absorption ceased, the reaction tube was cooled and the reaction products removed.

The alkylation product consisted of 96 g. of a brown liquid oil and a very small amount of brown sludge mixed with sodium pellets. The liquid product was fractionally distilled through a precision still packed with single turn glass helices. From 84 parts of propylene the following was obtained: Fraction I, pentene, boiling range 32–40° C., $N_D^{20}$, 1.3788, 46 parts; fraction II, boiling range 40–85° C., 3 parts; fraction III, heptene, boiling range 85–100° C., $N_D^{20}$, 1.4068, 19.5 parts, and high boiling residue, 15.8 parts. Based on propylene, this represents a 34.2% conversion to pentene and 10% conversion to heptene. The total liquid alkylate consisted of 55% pentene, 24% heptene, and 21% of high boiling material.

Example II

Eight parts of sodium metal, 10 parts of anthracene, and 84 parts of propylene were charged into a high pressure reaction tube and heated at 125° C. under 500 atm. ethylene pressure for 6–8 hours. During this period there was 855 atm. ethylene absorption producing 90 g. of liquid condensation product. Distillation gave 28 parts of pentene, 34.4 parts of heptene and no appreciable amount of higher boiling material. The total liquid condensation product consisted of 40% pentene and 49% heptene.

Example III

Eight parts of sodium metal, 10 parts anthracene, and 84 parts propylene were heated at 200° C. with ethylene at 500 atm. pressure. There was a total ethylene pressure drop of 970 atm. in 8 hours, and the product consisted of 152 parts of liquid condensation product mixed with 5 parts of sodium globules. Upon distillation, there was obtained 44 parts pentene and 68 parts heptene representing 31% conversion to pentene and 35% conversion to heptene. The liquid condensation product consisted of 31% pentene, 48% heptene and 21% high boiling material.

Example IV

Eight parts of sodium, 10 parts anthracene, and 100 parts isobutylene were charged into a reaction tube and heated at 125° C. and 500 atm. ethylene pressure for a period of 4 hours. During this time there was a total ethylene pressure drop of 1090 atm. Distillation of 122 parts of liquid condensate gave 15 parts hexene, boiling range 63–70° C., $n_D^{20}$, 1.3925, and 55 parts octene, boiling range 110–120° C., $n_D^{20}$, 1.4125. This represents 11% conversion to hexene and 29% conversion to octene. The remainder of the liquid product consisted of 31 parts of higher boiling residue.

Example V

Eight parts of sodium, 10 parts anthracene, and 100 parts isobutylene were heated at 200° C. under 500 atm. ethylene pressure for a period of 9 hours during which time there was a total ethylene pressure drop of 635 atm. The liquid condensation product weighed 162 parts and consisted of 55 parts hexene and 56 parts octene which represents a conversion of 38% hexene and 30% octene based on the isobutylene charged. The liquid condensation product consisted of 38% hexene, 39% octene, and 20% high boiling material.

Example VI

Eight parts of sodium metal, 10 parts anthracene and 100 parts butene-1 were heated at 125° C. under 500 atm. ethylene pressure for a period of 9 hours during which time there was a total ethylene absorption of 870 atm. Distillation of the liquid condensation product gave 29 parts hexene and 48 parts octene which corresponds to conversions based on butene-1 of 15% hexene and 25% octene. The liquid product consisted of 23% hexene, 50% octene and 23% high boiling material.

Example VII

Eight parts of sodium, 10 parts anthracene, and 100 parts butene-2 were heated at 125° C. under 500 atm. ethylene pressure for a period of 8 hours during which time there was a total ethylene absorption of 1400 atm. Distillation of 138 parts of the liquid product gave 47.3 parts of hexene, boiling range 61–71° C., $n_D^{20}$, 1.3995, and 48 parts of octene, boiling range 110–120° C., $n_D^{20}$, 1.4172 and 18 parts of high boiling residue. Based on butene-2 this represents a conversion to hexene of 33 and octene of 25%. The liquid product consisted of 39% hexene, 39% octene, and 15% high boiling residue.

Example VIII

A charge consisting of eight parts sodium, 10 parts anthracene, and 150 parts propylene was heated under 1000 atm. ethylene pressure at 150° C. There was a 42% conversion to pentene and 4.5% conversion to heptene. The total liquid condensation product consisted of 74% pentene, 10.5% heptene, and 11% high boiling hydrocarbons.

Example IX

Eight parts of sodium, 10 parts of acenaphthene, and 84 parts propylene were heated at 250° C. under 500 atm. ethylene pressure. Distillation of the liquid product gave 40 parts of pentene and 14 parts of heptene. Based on the propylene charged, conversions to pentene and heptene were 29% and 8% respectively.

*Example X*

Eight parts of metallic sodium, 10 parts of anthracene, and 100 parts of isobutylene were heated at 200° C. and 250 atms. ethylene pressure for a period of 12 hours. During this time there was a total ethylene absorption of 375 atms. Distillation of 129 parts of the liquid product gave a conversion of 29% hexene and 18% octene, based on the isobutylene employed. The total liquid product consisted of 38% hexene, 30% octene, and 32% higher boiling residue by weight.

The process of this invention is applicable to any two or more different normally gaseous open-chain monoolefin hydrocarbons containing less than five carbon atoms. Typical examples of normally gaseous open-chain monoolefin hydrocarbons are ethylene, propylene, isobutylene, butene-1 and butene-2 which undergo intermolecular condensation in this reaction to form low molecular weight normally liquid open-chain monoolefin hydrocarbons of the general formula $C_nH_{2n}$ in which $n$ is a whole number less than ten. In the reaction of an odd with an even numbered normally gaseous open-chain monoolefin hydrocarbon an odd numbered low molecular weight normally liquid open-chain monoolefin hydrocarbon is produced.

In a preferred embodiment of this invention, low molecular weight liquid monoolefins are produced by reacting under pressure of at least 100 atms. at least two different gaseous open-chain monoolefin hydrocarbons over an alkali metal, such as metallic sodium, in the presence of catalytic amounts of a polynuclear aromatic hydrocarbon preferably at temperatures in the range of 125° to 250° C. The upper limit of temperature at which the reaction can be carried out is determined by the tendency of the low molecular weight olefinic condensation product to undergo secondary complex polymerization and side reactions at high temperatures. To insure a practical rate of reaction and at the same time obtain high conversions to well defined, low molecular weight olefins, the use of temperatures between about 100° to about 300° C. is desirable.

The alkylation reaction of this invention, which employs alkali metals as catalysts, provides a means for obtaining normally liquid low molecular weight monoolefin hydrocarbons useful as fuels in internal combustion engines. These catalysts avoid the corrosion problems inherent in the acidic alkylation catalysts previously used.

The low molecular weight monoolefin hydrocarbons produced by this invention comprise an extremely valuable class of hydrocarbons which are particularly useful in the synthetic fuel industry as premium motor fuels. These materials can be used alone as motor fuels possessing high anti-knock values or as blending agents for paraffin hydrocarbon fuels to increase their octane number rating and oxidation stability. Thus the octane numbers of $C_6$ and $C_8$ olefins are 80 and 82.5 respectively as determined by the ASTM method D-357-48. The liquid monoolefins of this invention also have application as solvents for paints, lacquers, insecticides, dyestuffs and as chemical intermediates in reactions requiring well-defined monoolefin fractions.

As many apparently widely different embodiments of this invention may be made without departing from the spirit and scope thereof, it is to be understood that the invention is not limited to the specific embodiments thereof except as defined in the appended claims.

I claim:

1. A process for the intercondensation of at least two different normally gaseous open-chain monoolefin hydrocarbons into low molecular weight, normally liquid open-chain monoolefin hydrocarbons containing less than ten carbon atoms which comprises heating at least two different normally gaseous open-chain monoolefin hydrocarbons at a temperature from 100° to 300° C., under a pressure above 100 atms. in the presence of an alkali metal catalyst and a polynuclear aromatic hydrocarbon promoter, and separating therefrom a low molecular weight normally liquid open-chain monoolefin hydrocarbon containing less than 10 carbon atoms.

2. A process for the intercondensation of at least two different normally gaseous open-chain monoolefin hydrocarbons into low molecular weight, normally liquid open-chain monoolefin hydrocarbons containing less than ten carbon atoms which comprises heating two different normally gaseous open-chain monoolefin hydrocarbons at a temperature from 125° to 250° C., under a pressure from 200 to 1000 atms. in the presence of an alkali metal catalyst and a polynuclear aromatic hydrocarbon promoter, and separating therefrom a low molecular weight normally liquid open-chain monoolefin hydrocarbon containing less than 10 carbon atoms.

3. A process for the intercondensation of at least two different normally gaseous open-chain monoolefin hydrocarbons into low molecular weight, normally liquid open-chain monoolefin hydrocarbons containing less than ten carbon atoms which comprises heating two different normally gaseous open-chain monoolefin hydrocarbons at a temperature from 125° to 250° C., under a pressure of about 500 atms. in the presence of a metallic sodium catalyst and a condensed ring polynuclear aromatic hydrocarbon promoter, and separating therefrom a low molecular weight normally liquid open-chain monoolefin hydrocarbon containing less than 10 carbon atoms.

4. A process as set forth in claim 1 in which said catalyst is metallic sodium.

5. A process as set forth in claim 1 in which said catalyst is metallic potassium.

6. A process as set forth in claim 1 in which said promoter is anthracene.

7. A process as set forth in claim 1 in which said promoter is naphthalene.

8. A process as set forth in claim 1 in which said promoter is acenaphthene.

9. A process for the intercondensation of ethylene and at least one other normally gaseous open-chain monoolefin hydrocarbon into low molecular weight, normally liquid open-chain monoolefin hydrocarbons containing less than ten carbon atoms which comprises heating ethylene and said other normally gaseous monoolefin open-chain hydrocarbon at a temperature from 100° to 300° C., under a pressure above 100 atms. in the presence of an alkali metal catalyst and a polynuclear aromatic hydrocarbon promoter and separating therefrom a low molecular weight normally liquid open-chain monoolefin hydrocarbon containing less than 10 carbon atoms.

10. A process for the intercondensation of ethylene and propylene into low molecular weight, normally liquid open-chain monoolefin hydrocarbons containing less than ten carbon atoms which comprises heating said ethylene and propylene at a temperature from 125° to 250° C., under a pressure from 200 to 1000 atms. in the presence of a metallic sodium catalyst and anthracene as a promoter, and separating therefrom pentene.

11. A process for the intercondensation of butylene and at least one other normally gaseous open-chain monoolefin hydrocarbon into low molecular weight, normally liquid open-chain monoolefin hydrocarbons containing less than ten carbon atoms which comprises heating butylene and said other normally gaseous monoolefin open-chain hydrocarbon at a temperature from 100° to 300° C., under a pressure above 100 atms. in the presence of an alkali metal catalyst and a polynuclear aromatic hydrocarbon promoter, and separating therefrom a low molecular weight normally liquid open-chain monoolefin hydrocarbon containing less than 10 carbon atoms.

12. A process for the intercondensation of isobutylene and at least one other normally gaseous open-chain monoolefin hydrocarbon into low molecular weight, normally liquid open-chain monoolefin hydrocarbons containing less than ten carbon atoms which comprises heating isobutylene and said other normally gaseous open-chain monoolefin hydrocarbon at a temperature from 100° to 300° C., under a pressure above 100 atms. in the presence of an alkali metal catalyst and a polynuclear aromatic hydrocarbon promoter, and separating therefrom a low molecular weight normally liquid open-chain monoolefin hydrocarbon containing less than 10 carbon atoms.

WILLIAM V. FREED.

REFERENCES CITED

The following references are of record in the file of this patent:

UNITED STATES PATENTS

| Number | Name | Date |
| --- | --- | --- |
| 2,048,169 | Scott | July 21, 1939 |
| 2,146,447 | Scott | Feb. 7, 1939 |
| 2,181,640 | Deanesly et al. | Nov. 28, 1939 |
| 2,355,925 | Reid | Aug. 15, 1944 |
| 2,380,358 | Anderson et al. | July 10, 1945 |
| 2,395,381 | Squires | Feb. 19, 1946 |
| 2,405,950 | Hanford | Aug. 20, 1946 |